United States Patent [19]
Podporkin et al.

[11] Patent Number: 6,108,187
[45] Date of Patent: Aug. 22, 2000

[54] ELECTRIC POWER TRANSMISSION LINE WITH PROTECTION DEVICES AGAINST LIGHTNING OVERVOLTAGES

[75] Inventors: Georgy Viktorovich Podporkin; Alexandr Dmitrievich Sivaev, both of Saint-Petersburg, Russian Federation

[73] Assignee: Streamer Electric Company, Inc., St. Petersburg, Russian Federation

[21] Appl. No.: 09/068,832

[22] PCT Filed: Sep. 5, 1996

[86] PCT No.: PCT/RU96/00251

§ 371 Date: May 18, 1998

§ 102(e) Date: May 18, 1998

[87] PCT Pub. No.: WO97/19456

PCT Pub. Date: May 29, 1997

[30] Foreign Application Priority Data

Nov. 17, 1995 [RU] Russian Federation ............. 95119890
Nov. 24, 1995 [RU] Russian Federation ............. 95120469
Jun. 25, 1996 [RU] Russian Federation ............. 96112614
Jun. 25, 1996 [RU] Russian Federation ............. 96113580

[51] Int. Cl.[7] .................................................. H02H 1/00
[52] U.S. Cl. ........................................... 361/117; 174/144

[58] Field of Search ...................................... 361/110, 111, 361/117, 112, 118, 120, 126–132, 136–138; 174/4 R, 5 R, 140 R, 144, 140 C, 142, 140 H, 140 CR, 140 S, 141 R

[56] References Cited

FOREIGN PATENT DOCUMENTS

| 3101015 | 4/1991 | Japan | ............................. H01B 17/46 |
| 5041121 | 2/1993 | Japan | ............................. H01B 17/46 |
| 07272824 | 10/1995 | Japan | ............................. H01T 4/14 |

*Primary Examiner*—Ronald W. Leja
*Attorney, Agent, or Firm*—Cesari and McKenna, LLP

[57] ABSTRACT

An electric power transmission line with protection devices against lightening overvoltages in the form of a lighting arrester with a surface discharge. Having a relatively long discharge path, the impulse lightening flashover does not lap over a power arc of operational frequency and, after passing of the lightening overvoltage impulse current, the line will continue a trouble-free operation without being disconnected. Simple and reliable arrester designs are disclosed among which are fittings with dielectric covers and insulators, integrating their direct functions with the lightening arrester's functions.

33 Claims, 11 Drawing Sheets

6,108,187

ELECTRIC POWER TRANSMISSION LINE WITH PROTECTION DEVICES AGAINST LIGHTNING OVERVOLTAGES

FIELD OF INVENTION

The proposed invention can be related to the field of high-voltage techniques, more precisely for electric power transmission lines with protection devices against overvoltages during a thunderstorm, including those in a form of impulse lightning arresters.

PRIOR ART

The known high-voltage power transmission lines comprise, as a rule, a power conductor fastened on structures by means of insulators, and lightning protection facilities, i.e. devices for limitation of overvoltages, occurring when lightning strikes the line. The line can include several power conductors, if, for example, it is a multiphase one. As a rule, structures are grounded, but there could be also some ungrounded designs. Usually a power conductor is connected with a supply cable via a cable termination.

The most commonly used electric power transmission lines include arc horn arresters as devices limiting overvoltages, that are made in the form of two metal rods located directly close to insulators, or strings of insulators, or other protected line elements. The said metal rods are placed at some distance one from another, creating a spark gap, and when an overvoltage occurs as a result of lightning striking an electric power transmission line, the said discharge goes through the said spark gap of the arrester, thus protecting the insulator from destruction.

There is another well-known type of electric power transmission line with a facility for overvoltage limitation, made as a rectifying arrester, consisting of one or several (depending on the voltage class) standard elements, connected sequentially. Each of the said elements comprises discs of nonlinear resistors with spark gaps between them, wherein each of the spark gap and nonlinear resistors sets are placed within a porcelain hermetically sealed cover (cf. High voltage techniques. Ed. D. V. Razevig, M., Energiya, 1976, p. 300).

Lines with such arresters are reliable, but the rectifying arresters included therein are complicated and expensive, increasing costs for their usage and construction of the whole line.

Another known electric power transmission line with a facility for overvoltage limitation, made as a tube arrester, consists of a vyniplastic tube, blind with a metal cover, that is one of the end electrodes. On the said cover an inner rod electrode is fixed. The free electrode and the end one, fixed at the free end of the tube are the main electrodes. In such a line, the arrester tube is separated from the power conductor by an external spark gap (cf. High voltage techniques. Ed. D. V. Razevig, M., Energiya, 1976, p. 289).

This known line has a drawback of protection unreliability, for its arrester operation is accompanied with the release of highly ionized allied gas, and this can initiate flashover of air insulation in the case of adjacent phase conductors and grounded constructions ingress into a zone of arrester exhaust. The known design arrester has a limited range of interrupted currents and is short-lived because the vyniplastic tubes burn out when discharge current flows through them.

There is also a high-voltage support insulator type which consists of an insulation body (in particular, fabricated of ceramics) having sheds as well as metal flanges at the ends thereof serving for fixation of the insulator to the support structure (cf. High voltage techniques. Ed. D. V. Razevig, M., Energiya, 1976, p. 78).

There is yet another support ceramic insulator which comprises an insulating ceramic body with spiral sheds and metal flanges, placed at the ends of it (cf. High voltage technics. Ed. D. V. Razevig, M., Energiya, 1976, p. 85).

The known insulators in lightning overvoltage circumstances have an air gap between the metal flanges flashovered, and then the said gap, under effect of the operational frequency voltage applied to the power conductor turns into a power arc of the line, which requires the emergency cut-off of a high-voltage line containing the mentioned insulator.

There is a fitting known for insulator fastening to structure having form of a straight glass-plastic bar having one of its ends fixed on a structure, and at the other end the high-voltage insulator is placed (cf. High voltage techniques. Ed. D. V. Razevig, M., Energiya, 1976, p. 88). The said fitting will increase the flashover voltage of the main insulation of an electric power transmission line, that contributes to its more reliable operation. Nevertheless, it requires additional devices installed for protecting the high-voltage elements against lightning overvoltages. Apart from that, the cost of such a fitting is quite high.

Another fitting is made in a form of a dielectric concrete beam, on which a high-voltage insulator is placed. It is also possible to fix the conductor of an electric power transmission line on the insulating beam without an insulator (cf. High voltage techniques. Ed. D. V. Razevig, M., Energiya, 1976, p. 87). In the first case the high reliability of line operation is achieved, but this method is too expensive. In the second case, less expenses are combined with a significant decrease of the line operation reliability under conditions of pollution and humidification.

The device closest to the present invention is the one in the form of a straight or curved metal rod, one end of which is fixed on a structure, and at the other end a high-voltage insulator is mounted (cf. Sinyavskiy V. N. Calculating and constructing of electroceramic constructions. M., Energiya, 1977, p. 58). The fitting is rather simple, reliable and cheap, but due to lightning overvoltages there happens an impulse flashover of the insulator, and the discharge channel is terminated on the said fitting. Moreover, the path length of insulator impulse lightning flashover is not significant and, as a result, the impulse lightning flashover turns into a power arc of an operational frequency that leads to the necessity of an emergency line cut-off.

DESCRIPTION OF INVENTION

The aim of the present invention is to create a reliable and inexpensive in construction and operation electric power transmission line by virtue of increasing the reliability and simplifying the means for protecting against lightning overvoltages.

The next goal of the invention is to increase the reliability of and simplify the impulse lightning arrester's construction the construction of a lightening arrester for electric power transmission lines, which would be capable of being easily installed on the line, ensuring high reliability of its elements protection from discharge flashovers turning into a power arc, and reducing the number of lightning blackouts to a minimum.

Another aim of the present invention is the creation of fittings performing a simple, reliable and inexpensive fastening of insulators, conductors and other high-voltage elements of power transmission to a line structure, as well as providing trouble-free operation of the line under lightning overvoltage.

One more aim is the creation of an insulator which would have high reliability under overvoltages caused by lightning striking an electric power transmission line and, like an arrester, protecting discharge flashovers from turning into a power arc, and reducing the number of lightning blackouts.

The above objects are realized, if in an electric power transmission line, including at least one grounded structure, at least one power conductor fixed on the said structure, at least one insulation element of the said power conductor from the said structure or from the other line elements subjected to an electric potential that differs from the power conductor potential, and protective means of the said element, insulating from a lightning overvoltage, that are made in the form of at least one impulse spark arrester with two main electrodes, the said impulse spark arrester is made in the form of a surface discharge arrester, such that flashover length between two main electrodes of the arrester is bigger than the length of a flashover of the protected insulation element, and the said arrester flashover voltage is lower than the flashover voltage of the protected insulation element.

For instance, an air gap, ceramic insulator, string of insulators etc. can serve as the protected insulation element.

The reliability of the line will be optimized if the said arrester is made with a flashover distance between the main electrodes, that can be defined by the following expression:

$$L > 0.06 \ U^{0.75}$$

where:
L=flashover path length, m
U=rated line voltage, kV.

The invention aims can be met also by undertaking that in an electric power transmission line, including at least one grounded structure, at least one non-insulated conductor, at least one insulation element of the said power conductor from the other line elements subjected to an electric potential different from the said power conductor potential, for example, from the said structure, and also protective means of the said element against lightning overvoltages, the said means of protection are made in a form of a dielectric cover located on the said power conductor in the way of the protected insulation element location, such that a puncture voltage of the mentioned dielectric cover is higher than the flashover voltage at its surface, and the length of the said dielectric cover is defined by the following expression:

$$\frac{2 \times (0.06 U^{0.75} - h)}{n} < D < \frac{2 \times (0.5 U^{0.75} - h)}{n}$$

where
D=dielectric cover length, m;
h=flashover length of the protected line insulation element, m;
n=number of conductors between which the protected insulation element is located and where the said dielectric covers are placed;
U=rated line voltage, kV.

In the mentioned version an air gap, for instance, can serve as a protected insulation element, wherein the said dielectric cover can be mounted either on one or several power conductors, or on a lightning shield wire.

In another modified version, the insulation element is made in the form of an insulator fastened to the said structure, wherein the said dielectric cover is located on the power conductor in the way of the said power conductor fixation to the protected insulator, such that a fastening element for connecting the said power conductor to the protected insulator is located on the external surface of the said dielectric cover and the distance between the fastening element and the end of the said dielectric cover is defined by the following expression:

$$0.06 \ U^{0.75} - h < l < 0.5 \ U^{0.75} - h$$

where
l=distance between the fastening element and the end of the dielectric cover, m;
h=protected insulator flashover path length, m;
U=rated line voltage, kV.

In that version, the protected insulator can be, for instance, a conventional ceramic insulator, a string of insulators, etc.

The invention goal can also be achieved by undertaking that in an electric power transmission line, including at least one structure, at least one non-insulated power conductor, fixed on the said structure, at least one insulation element of the said power conductor from the other line elements, subjected to an electric potential different from the said power conductor potential, for example, from the said structure, at least one cable input with termination, and also protective means of the said element against lightning overvoltages, the said means of protection are made in the form of a termination being longer than the flashover path length of the protected insulation element, and the insulation of the termination is made in such a way, that the flashover voltage of the termination is lower than that of the protected insulation element. In so doing the termination length is defined by the following relationship:

$$0.06 \ U^{0.75} < l < 0.5 \ U^{0.75}$$

l=termination length, m;
U=rated line voltage, kV.

In case of an electric power transmission line being constructed with an insulated power conductor, the invention task is solved by ensuring that the electric power transmission line comprises at least one structure, at least one insulated power conductor fixed on the said structure by means of a fastening element, at least one insulator of the said power conductor from the said structure, and also protective means of the said insulator against lightning overvoltages, such that, the said means of protection are made in a form of at least one orifice in the insulation of the power conductor, and that the said orifice is located from the fastening element at a distance defined by the following relationship:

$$0.06 \ U^{0.75} - h < l < 0.5 \ U^{0.75} - h$$

where:
l=distance from the said orifice to the said fastening element, m;
h=protected insulator flashover path length, m;
U=rated line voltage, kV.

An impulse spark lightning arrester that solves the task of the present invention, comprises an elongated body made of a solid dielectric material, at the ends of which end electrodes for connecting the arrester to electric transmission elements are placed, wherein within the said elongated body of the arrester a rod electrode is fitted, such that the said rod electrode occupies the whole length of the mentioned arrester body and is connected with both of the end electrodes, forming a unified main electrode, and over the external surface of the said arrester body in its middle part, the second main electrode is located. To provide an effective protection of the electric transmission element by means of such an arrester, the path of a flashover, spreading over the surface of the elongated dielectric body between two main arrester electrodes, should be longer than the flashover spark path of the protected electric transmission element, for example, an insulator. That is the reason why the distance between the second main electrode and each of the end electrodes is defined by the following relationship:

$$0.06\ U^{0.75} < L < 0.5\ U^{0.75}$$

where:

L=distance between the second main electrode and each of the end ones, m;

U=rated voltage of the arrester, kV.

Another version of an impulse lightning arrester that solves the task of the present invention, represents by itself an elongated body made of a solid dielectric material, at the ends of which two end electrodes for connecting the arrester to electric transmission elements are placed and, inside and/or over the surface of the said dielectric body metal, semi-conducting or segneto-electric particles are dispersed to provide a flashover voltage of the said body lower than the flashover voltage of the protected electric transmission element or an element belonging to an electrical installation and that the distance between two main electrodes is more than the flashover path of a protected electric transmission element or element of an electrical installation. The distance between the main electrodes of the arrester is defined by the following relationship:

$$0.06\ U^{0.75} < L < 0.5\ U^{0.75}$$

where:

L=distance between the main electrodes of the arrester, m;

U=rated voltage of the arrester, kV.

The mentioned metal, semi-conducting and segneto-electric particles are to have their size from 10 mcm up to 5 mm and to be contained in the said dielectric body at a volumetric density from 5% to 30%. The volumetric density of particles is the ratio of the total volume of particles to the overall volume, in which the said particles are contained.

The high-voltage insulator solving the task of the present invention and designed for mounting the power conductor on an electric power transmission line structure, comprises an insulating body having spiral sheds, with one end of the said body providing the power conductor fastening, and the second one—providing insulator fastening on the structure, such that inside the insulating body, there is a guiding electrode whose length is bigger than a half of the said insulating body, and the said electrode is mounted inside the insulating body in such a way that the puncture voltage of the mentioned insulating body is higher than the flashover voltage of the insulator.

The task of the invention is solved also by a fitting for fastening an electrotechnical high-voltage element to an electric power transmission line structure, made in a form of a straight or curved metal rod with one end intended for the said high-voltage element installation, and another one for fastening to the said electric power transmission line structure, and the said rod is covered by a dielectric cover on its side surface and the end surface provided for the high-voltage element of electric power transmission to be installed on. Moreover, the puncture voltage of the dielectric cover is higher than the flashover voltage of the cover, and the length of the insulating cover is defined by the following relationship:

$$L > 0.06\ U^{0.75},\ m$$

where:

U=rated line voltage, kV.

Electric power transmission line structures, walls, housing details and other structural elements can be used as an electric power transmission structure to which the fittings may be fastened.

The other specific construction versions of an electric power transmission line, arrester, insulator and fittings, giving some additional effect, are described below.

The lightning overvoltage protection is based on one and the same principle in all the given construction versions of an electric power transmission line, as well as for using the described arrester, insulator and/or fitting.

When lightning strikes an electric power transmission line, an impulse flashover of the nearest insulator or insulation gap will happen. After the impulse flashover of an insulation, there will either be a development of an electric discharge which turns into a power arc at the operational voltage, thus meaning a short-circuit of the line is possible, or restoration of electric insulation steadiness after the lightning current was passed through a discharge channel and a structure to ground, meaning normal line operation with no outage.

The probability of a power arc or development depends mostly on the rated line voltage $U_{nom}$ and flashover path length L. When the rated voltage is set, the probability of power arc or development $P_a$ is approximately inversely proportional to the flashover length L:

$$P_a \equiv 1/L.$$

Due to L increase (for example, twofold), it is possible to reduce equally the probability of the power arc follow and, accordingly, to reduce the number of outages of the line (for the given example by two times).

We have managed to find a technical possibility to create a rather long flashover path length at the cost of surface discharge effect over the dielectric surface. This technical method of flashover path length increase can be used in an electric power transmission line with an impulse spark lightning arrester. For this, the arrester should be made in a form of an arrester with a surface discharge and have relevant parameter proportions.

We have also managed to find out, that the impulse flashover in case of lightning striking an electric power transmission line can develop rapidly over a power conductor dielectric insulation up to a distance longer than that of a standard insulator. Consequently, should the said discharge impulse have a possibility of developing over the surface of the power conductor insulation, it may be possible to gain a considerably longer flashover path and, consequently, to decrease the possibility of the power arc development or follow.

The fitting design to fasten an electrotechnical high voltage element to an electric power transmission structure, as set forth herein, will ensure the achievement of the same goal—to increase the flashover path length as a result of discharge development over the dielectric insulation surface of the fitting.

A high-voltage insulator design, as set forth herein, will also ensure to reach the same goal namely to increase the flashover path length because of the discharge development over the dielectric insulation body surface along the spiral-like trajectory between the spiral sheds.

The flashover path length of the impulse spark lightning arrester surface, or on the surface of a cable termination insulation should be bigger than the length of the flashover path of the protected element of the line. In some versions described herein, the sum of the flashover path length over the insulation surface of a power conductor, and the length of the protected element is more than the length of the flashover path of a protected element. Similarly, in some versions the flashover path length of the fitting rod plus the length of the protected element is more than the flashover path length of the protected element.

The minimum flashover path length $L_{min}$, providing a sufficient increase of the protection reliability, can be defined by the following expression:

$$L_{min} = 0.06 \, U^{0.75}, \text{ m}$$

where:

U=rated line voltage, kV.

Table 1 gives some data on published maximum insulation length values $l_{ins}$, used nowadays.

TABLE 1

| $U_{nom}$, kV | $l_{ins}$, m | $L_{min}$, m | $L_{min}/l_{ins}$ |
|---|---|---|---|
| 6 | 0.15 | 0.2 | 1.5 |
| 35 | 0.50 | 0.9 | 1.7 |
| 110 | 1.40 | 2.4 | 1.7 |
| 220 | 2.40 | 3.5 | 1.5 |
| 500 | 4.60 | 6.3 | 1.4 |
| 750 | 7.00 | 9.0 | 1.3 |
| 1150 | 10.5 | 12.2 | 1.2 |

As shown in Table 1, the length of a flashover path, defined by the above-mentioned expression, goes up by at least 20–70% higher than the maximum standard insulation length.

The obtaining of the required result in increasing protection reliability against short circuits in electric power transmission can be explained with the following.

In the impulse spark lightning arrester, according to the given invention, a rod electrode, located along the whole length of an elongated dielectric body, initiates discharge passing over the whole length of the arrester insulation body surface, and the impulse electric strength of this spark gap will prove to be less, than that of the protected element of an electric power transmission line, precisely, of the insulator or the insulation gap. Moreover, due to the considerably long surface flashover path of the said arrester, one can prevent a power arc development or follow after an impulse lightning current has passed. The greater the distance of the said arrester flashover path is, the less is the probability of the power arc follow and number of line outages.

In another version of the impulse spark lightning arrester, when overvoltage takes place as a result of lightning striking, metal, semi-conducting or segneto-electrical particles dispersed inside and/or over the body surface will trigger discharge passing over the whole length of the arrester surface, and its electrical strength will prove to be lower, than that of the protected insulation element of electric power transmission line, precisely of the insulator or insulation gap. Moreover due to the considerably long flashover path of the said arrester, one can prevent a power arc follow after an impulse lightning current has passed. The greater the distance of the said arrester flashover path, the less is the probability of a power arc follow and the number of line outages.

In a fitting designed to fix an electrotechnical high-voltage element to an electric power transmission structure, as recited in the claims, a discharge channel begins to develop from a power conductor, bypasses the insulator and reaches insulation coated on the fitting's rod. Then, the discharge channel is forced to slide over the insulation up to the stage when it reaches the non insulated end of the metal rod. The lightning overvoltage current will pass from the power conductor through the discharge channel into a structure and further into ground. In doing so, due to a considerably long flashover path, one can prevent the power arc follow.

In a high-voltage insulator according to our invention, under an overvoltage condition the guiding electrode inside the insulation body will provide forming of a surface discharge over the insulator surface within an inter-shed gap by spiral trajectory, the length of which is much more than that of the insulator itself. Consequently, after a lightning overvoltage impulse current has passed, a power arc of operational frequency voltage will not occur, and an electric power transmission line comprising the said insulator can go on with trouble-free operation.

BRIEF DESCRIPTION OF DRAWINGS

The applied claims are illustrated with drawings that show:

PREFERRED EMBODIMENTS OF THE INVENTION

Figure 1:
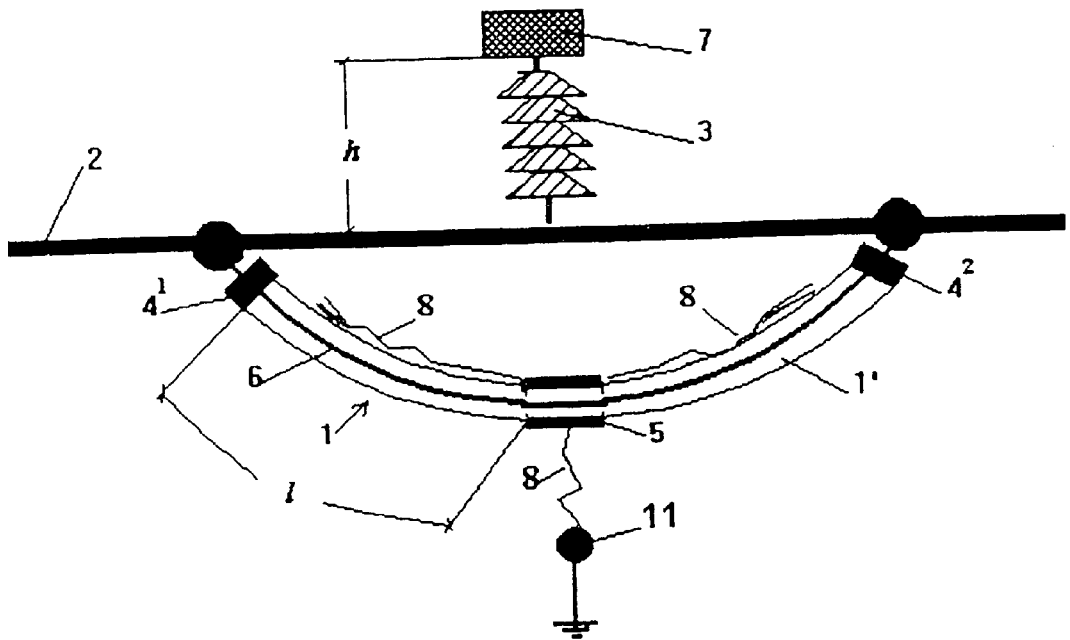
FIG. 1—Diagram of an one-phase electric power transmission line with an impulse lightning arrester.

FIG. 1 is a drawing of an electric power transmission line with an impulse spark lightning arrester 1, connected to a power conductor 2 electrically in parallel with an insulation protected element, in the given case, with the insulator 3. Moreover the end electrodes $4^1$ $4^2$ of the arrester are connected to the power conductor 2 of the line, i.e. have with it a direct electrical contact, and a second electrode 5 is connected to the grounded electrode 11, disposed on the said line, through the air spark discharge gap, i.e. electrical contact between the electrodes 5 and 11 arises only in a case of breakdown of the gap between the said electrodes.

The impulse lightning arrester 1 comprises the elongated body $1^1$, made of a solid dielectric material, at the extremities of which end electrodes are located, denoted as $4^1$ and $4^2$. Inside the said body $1^1$ from one end to the other rod electrode 6 is placed, connected electrically with the end electrodes $4^1$ and $4^2$, and forming together with them the first main electrode. In the middle part of the elongated body $1^1$ on its surface the second main electrode 5 is placed.

It is also possible to establish an electric power transmission line as per this version, when an arrester 1 is connected by its end electrodes $4^1$ and $4^2$ with the power conductor 2, wherein its second main electrode 5 has a contact with the grounded structure 7 of an electric power transmission line.

In an electric power transmission line, having a construction shown in FIG. 1, upon lightning overvoltage striking in the conductor between the grounded electrode 11 and the second main electrode 5 of the arrester, which has at that moment the potential of the conductor 2, there occurs a breakdown of the spark air gap by the channel 8 of discharge, after which that channel continues to spread over the arrester surface along paths 8 between the electrode 5 and the end electrodes $4^1$ and $4^2$, due to the rod electrode 6 availability inside of the arrester insulation body, forming a surface discharge on its surface. Simultaneously, an overvoltage limitation between the conductor 2 and the structure 7 takes place, and along the discharge channel 8 goes the impulse current, attributed to lightning overvoltage, after which the electric power transmission line restores its normal working mode.

The length of arrester flashover path, i.e. distance l between each of the end electrodes $4^1$ and $4^2$ and the second main electrode 5, exceeds the length of the protected insulator 3 flashover path h. Moreover the operation voltage of the arrester 1 is lower, than that of the insulator 3. Precisely, for example, for an electric power transmission line with a rated voltage 35 kV, the arrester 1 length equals to 4 m, and the length of the flashover path is approximately equal to a half of the arrester length, i.e. 2 m. Flashover voltage of the arrester is 200 kV. The insulators used in such electric power transmission lines have a length of 0.4 m and a flashover voltage of 300 kV. With such interrelation among the parameters, a flashover due to lightning striking into an electric power transmission line will not strike over the insulator 3, but over the surface of arrester 1 between the end electrodes $4^1$ and $4^2$ and the second main electrode 5, connected electrically to ground. Due to the fact that the flashover length of the arrester 1 surface is sufficiently long, the discharge will not turns into a power arc, and a short-circuit of the line will not occur, the physical bases for this being described above in more detail.

The given embodiment is suitable in regions with low average wind speeds, considerably changing the distance between the second main electrode 5 of the arrester 1 and the grounded electrode 11.

Figure 2:
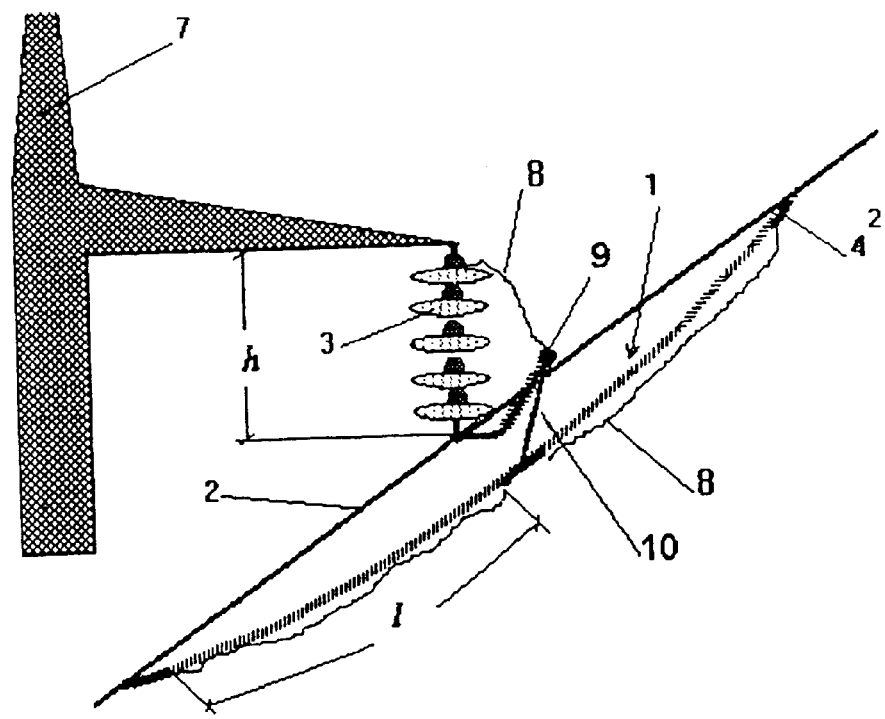
FIG. 2—Modified diagram of an electric power transmission line with an arrester.

In an electric power transmission line shown in FIG. 2, the arrester 1 is connected with the grounded structure 7 through a spark air gap. In this modification, a rod insulator 9 is fastened to the protected insulator string 3, and the free end of the said insulator is located at such a distance from the structure 7, that provides, under an overvoltage, the spark connection of it to the arrester 1. That arrester is connected by way of its second main electrode 5 with a conducting lead 10 to the mentioned free end of the rod insulator 9. In this version, conductor rocking by wind will not lead to a change of the spark air gap between the insulator 9 end and the structure 7, and the arrester 1 operation will remain stable independently of the conductor rocking.

Figure 3:
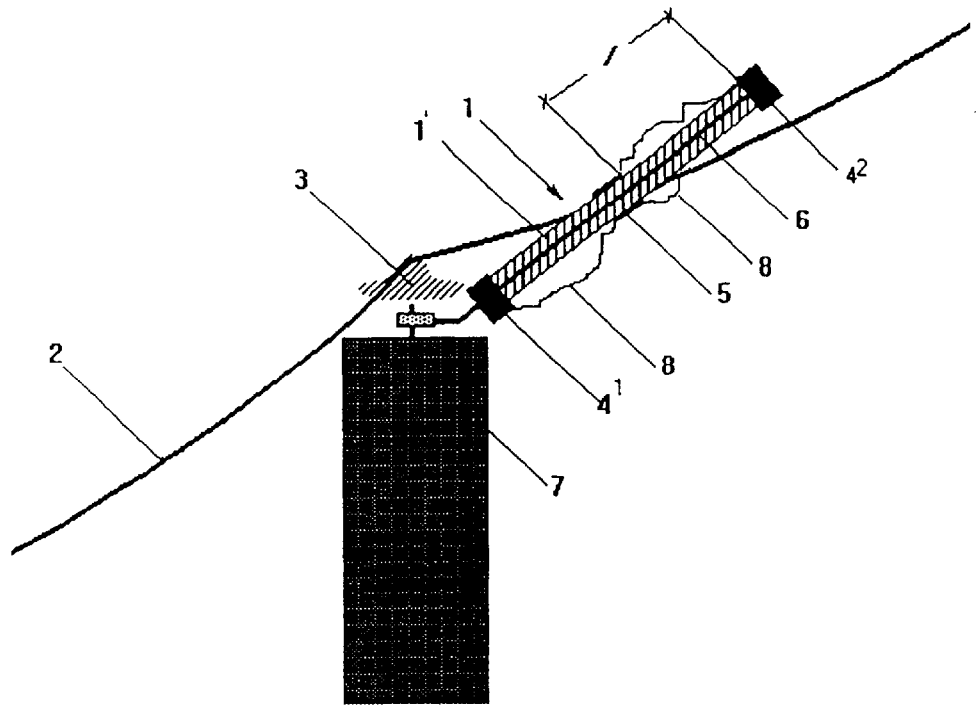
FIG. 3—Diagram of an electric power transmission line with an arrester that is fastened by one of its ends on a structure.

FIG. 3 is a drawing of an electric power transmission line with an arrester 1 fastened by one of its end electrodes to the grounded reinforced concrete structure 7.

The arrester consists of the rod electrode 6, coated with the solid insulation $1^1$, the end electrodes $4^1$, $4^2$, one of which $4^1$ is connected to the structure 7, the metal tube 5, placed on the top of the insulation $1^1$ and playing the role of the second main electrode.

The arrester is placed in such a way that its second main electrode 5 is connected to the power conductor 2 through a spark air gap.

The metal rod 6 of the arrester 1 has the potential of the structure 7. Due to a large capacitance between the rod electrode 6 and the second main electrode 5, it actually has the same potential as the said rod, i.e. the potential of the structure 7. So the overvoltage between the conductor 2 and the structure 7 is also applied between the said conductor 2 and the tube 5. If the said overvoltage is big enough, a spark will strike across the air gap, and the overvoltage will be applied between the main electrode 5 and the rod electrode 6. Resultantly, from the electrode 5 over the insulation $1^1$ surface, a flashover develops to one or two sides of the said arrester up to the stage, when the said flashover is shorted on the end electrodes $4^1$ and $4^2$.

Similarly, an electric power transmission line functions with an impulse lightning arrester, described in the following examples.

Figure 4:
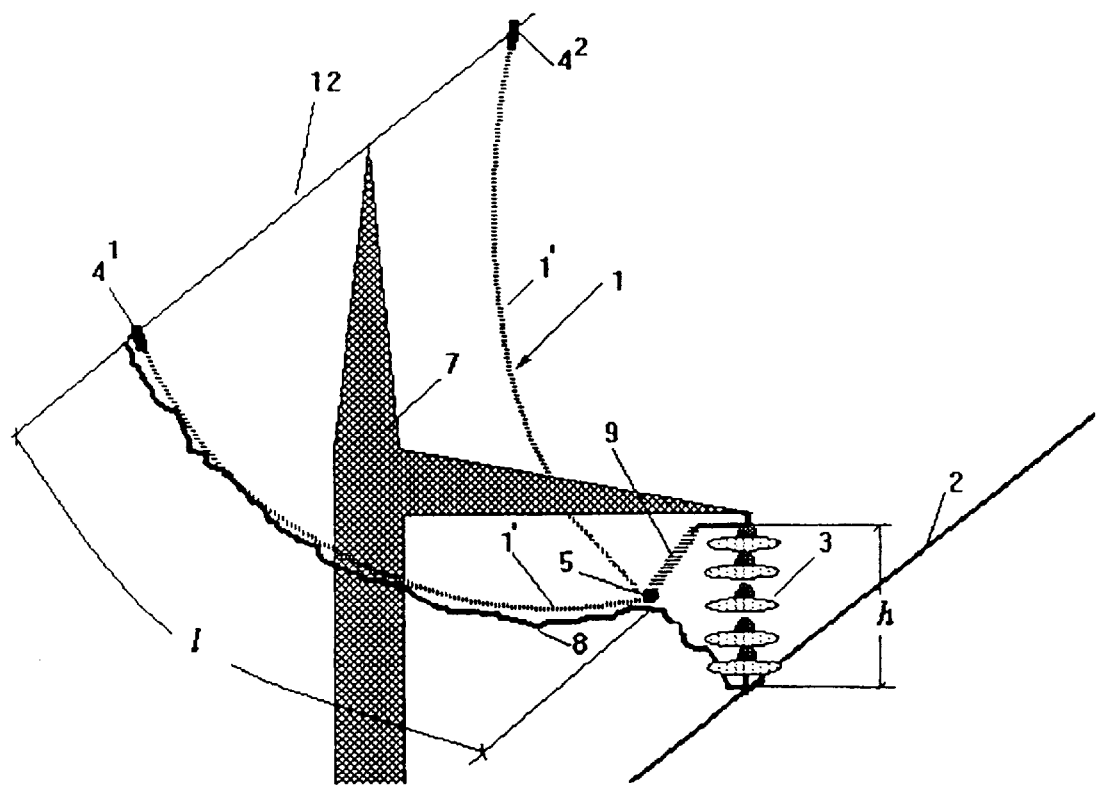
FIG. 4—Diagram of an electric power transmission line with an arrester that is connected to the lightning shield wire.

FIG. 4 is a drawing of an electric power transmission line, where by contrast to the previous example, the power conductor 2 is connected to the second main electrode 5 of the arrester 1 through a spark air gap. The arrester 1 in this example is connected by its end electrodes $4^1$ and $4^2$ with a lightning shield conductor 12 of the electric power transmission line, and the second main electrode 5 is connected with the said rod insulator 9, placed at the insulator string 3. Thus, the second main electrode 5 is connected through the spark air gap to the power conductor 2. In this case, when the impulse overvoltage occurs between the said power conductor 2 and the structure 7, at first a discharge channel 8 is formed in the air gap between the conductor 2 and the electrode 5, and then a surface discharges develop up to both of the end electrodes $4^1$ and $4^2$ of the said arrester.

Figure 5:
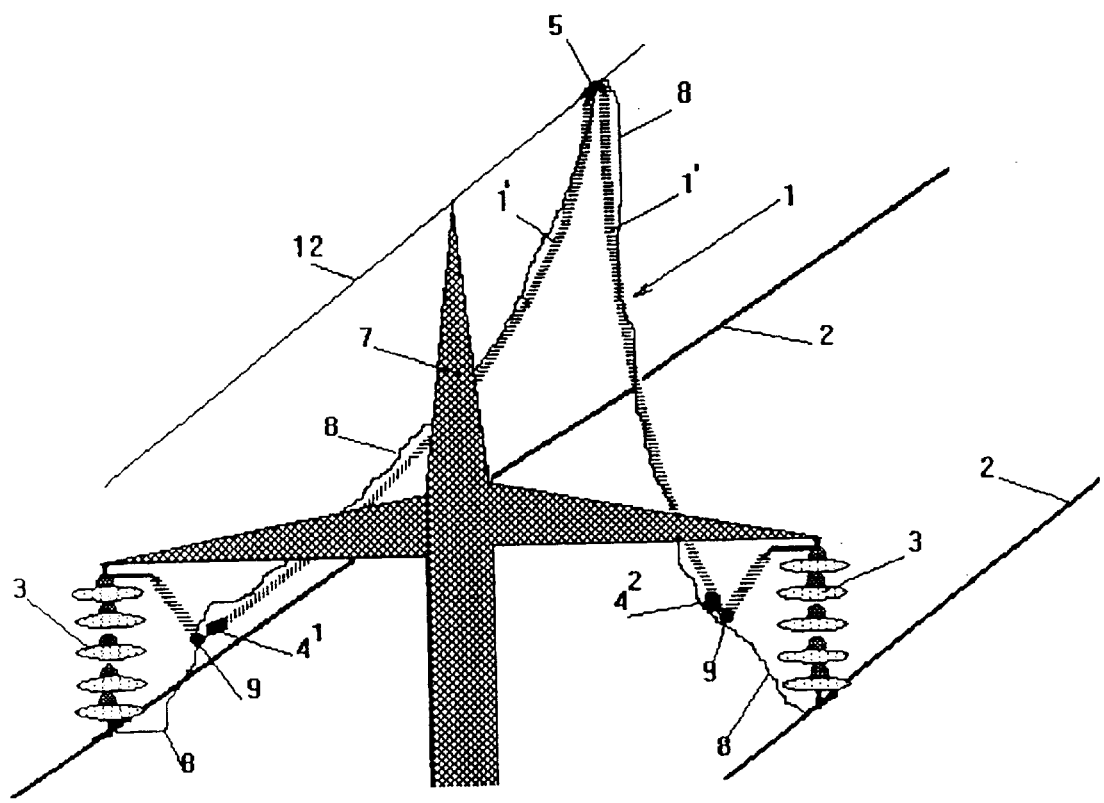
FIG. 5—Diagram of a two-circuit electric power transmission line with an arrester.

The invention can be used also for a two-circuit electric power transmission line, as illustrated in FIG. 5.

In this case it is expedient to use for both line circuits protection one and the same arrester, such that the second main electrode 5 of the arrester 1 is connected with the lightning shield wire 12 of the line, as shown in FIG. 5, or with its grounded structure 7, wherein the end electrodes $4^1$ and $4^2$ are linked with power conductors 2 of the same phases of different line circuits through the spark air gaps, as is clear from the examples given above.

Figure 6:
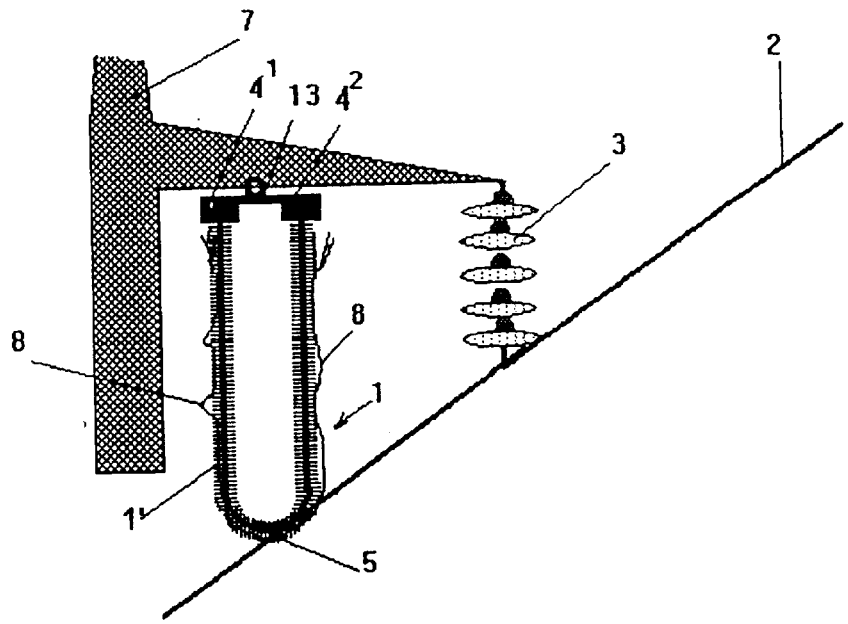
FIG. 6—Diagram of an electric power transmission line with a loop-like arrester.

In some cases, to provide an easier arrester, installation, it is expedient to use a modification shown in FIG. 6.

In this example the elongated body $1^1$ of the arrester is made in a form of a loop, and the end electrodes $4^1$ and $4^2$ are connected electrically by a jumper 13. Moreover, the arrester 1 is connected with the jumper 13 to one of the line elements, particularly, to the grounded structure 7, and via the second main electrode 5—to an element with an opposite potential, particularly, to the power conductor 2.

Figure 7:
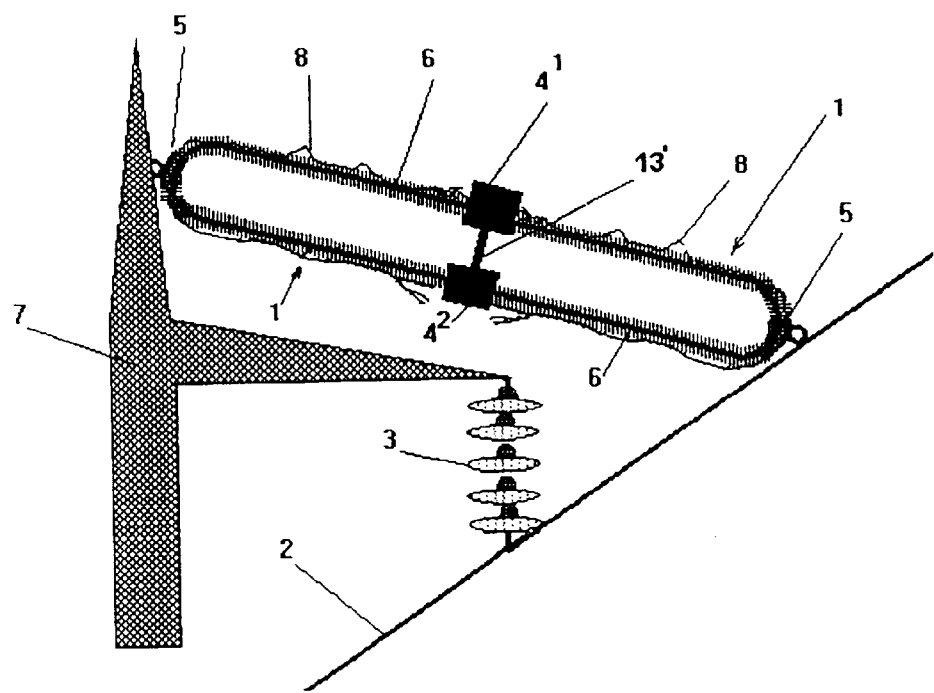
FIG. 7—Diagram of an electric power transmission line with a doubled arrester.

FIG. 7 is a partial diagram of an electric power transmission line, where the arrester 1, described in the previous example, is connected to the analogous arrester 1, forming a doubled arrester, such that the end electrodes $4^1$ and $4^2$ are connected with each other and linked by the common jumper 13.

In this case, the total flashover length of the arrester L will correspond to the distance between the electrodes 5 connected to the conductor 2 and the structure 7.

Similar doubled arresters can be connected into a string, in which arresters are connected to each other by the second main electrodes 5.

These modifications can be used in electric power transmission lines with highest voltage rates. Moreover, the increase of the number of spark gaps connected step-by-step eases the operational conditions of the arrester insulation internal body.

According to the present invention, in an electric power transmission line, an arrester can also be connected in series with a protected element.

Figure 8:
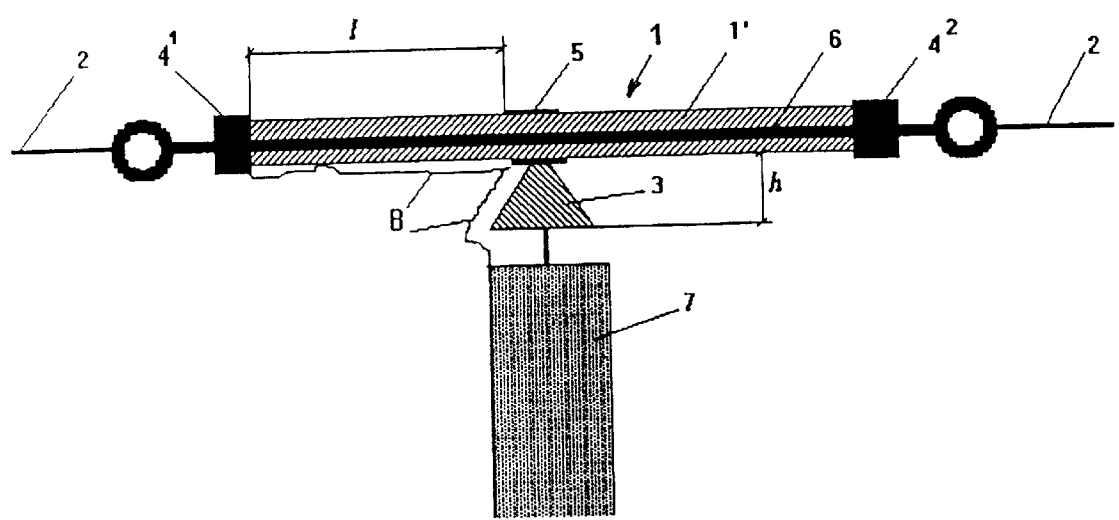
FIG. 8—Diagram of an electric power transmission line with an arrester that is placed in way of the power conductor disconnection.

In FIG. 8, an electric power line with the arrester 1 is shown, which is connected electrically in series with the protected insulator 3 at the breakage point of the power conductor 2. In this case, an arrester with its end electrodes $4^1$ and $4^2$ is connected with the power conductor 2 at its breakage point, wherein the second main electrode 5 is connected with the protected insulator 3. In this version, as in the following related ones, an impulse flashover distance between the line elements, subjected to different potentials, particularly, in the construction shown in the FIG. 8 between the conductor 2 and the structure 7, is defined by the sum of flashover lengths l and h of the arrester and the insulator, respectively.

That is why in the versions of a line whose arrester 1 is connected in series with a protected element, an impulse flashover path length will always be more than that of the protected element itself, particularly, in accordance with FIG. 8 the insulator 3. Thus, the arrester protection is provided to prevent an impulse flashover turning into a power arc.

Figure 9:
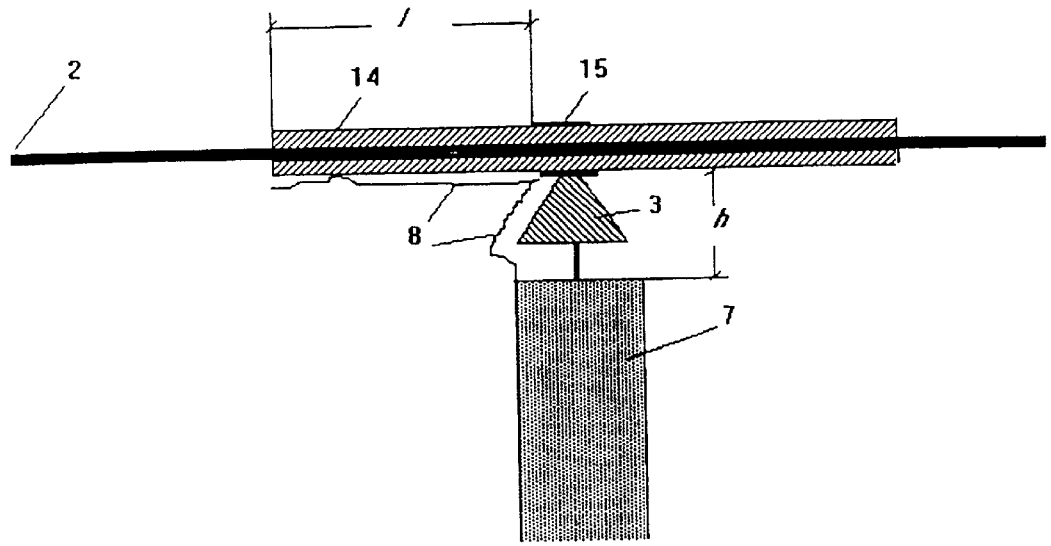
FIG. 9—Diagram of an electric power transmission line with means of protection against overvoltages, made in the form of dielectric cover placed over the power conductor.

The next construction version of an electric power transmission line is shown in FIG. 9. In this version an electric power transmission line comprises the structure 7, the power conductor 2 and the insulator 3 of the said power conductor 2 from the structure 7. On the power conductor 2 in the way of its fixation to the protected insulator 3 a dielectric cover 14 is placed, for example in a form of a sleeve or a cut tube or a ribbon, wound around the power conductor, etc. Over the external surface of the said dielectric cover 14 a fastening element 15 is installed to fix the power conductor 2 to the insulator 3. In this version, an impulse flashover distance is defined by the sum of flashover lengths l and h of the cover and of the insulator, respectively. The fastening element 15 may be made, for instance, in a form of a yoke or a ring, embracing the dielectric cover 14.

For example, for an electric power transmission line with a nominal voltage of 10 kV, the distance l from the said fastening element 15 up to the dielectric cover end 14 can be, for example, equal to 0.6 m. Insulators usually used in such lines, have a flashover length of 0.2 m. If lightning strikes this kind of line, the resulting overvoltage between conductor 2 and structure 7 will lead to a formation of the spark discharge channel 8, including the section of insulator 3 flashover with a length h, and the section of flashover over the surface of the dielectric cover with a length l. Thus, a total flashover path length will equal to 0.8 m, that will exclude power arc follow and short-circuit of the line.

Figure 10:
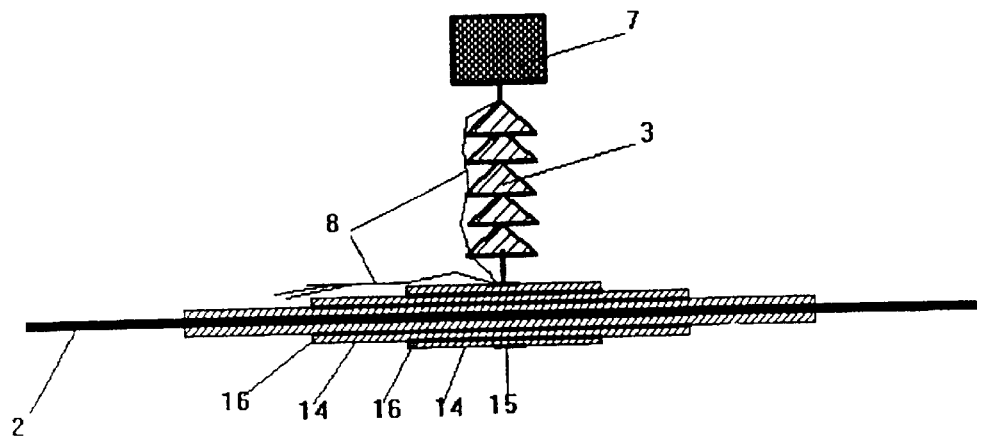
FIG. 10—Modified diagram of the electric power transmission line shown in FIG. 9.

In the version shown in FIG. 10, fastening element 15 is fixed through a set of alternately insulating 14 and conducting 16 layers. It will provide an equalized electric field gradient in flashover dielectric cover 14 and thus an increase in the reliability of dielectric insulation performance.

Figure 11:
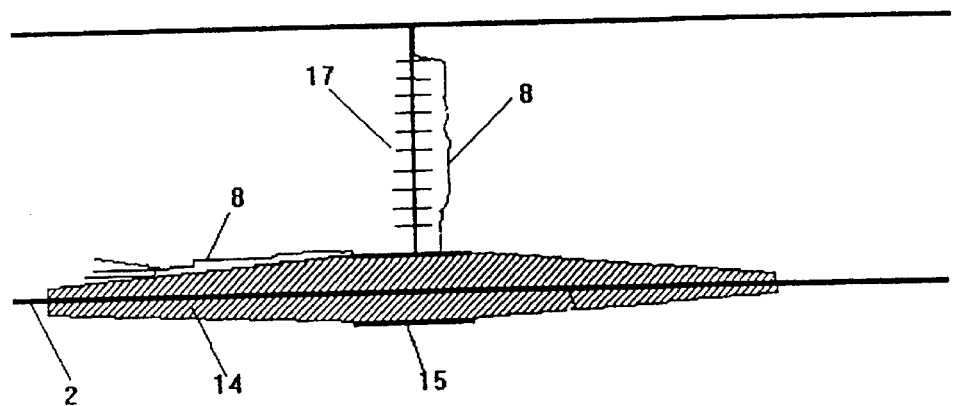
FIG. 11—Another version of an electric power transmission line with means of protection against overvoltages, made in the form of dielectric cover.

In FIG. 11 another electric power transmission line version is shown as a particular case of a multiphase line with use of a dielectric cover on one of the conductors. In this version on one of the conductors the dielectric cover 14 is mounted. The protected insulation element, in this case is a phase to phase polymer separator 17. It is fixed by means of the fastening element 15 at one of its ends to the said dielectric cover 14, and by another end—to the adjacent conductor, subjected to other potential. Under an overvoltage between the conductors there will occur flashover of the separator 17, and then the discharge channel 8 will develop from the fastening element 15 over the dielectric cover 14 surface up to the non-insulated part of the conductor. Particularly for electric power transmission lines with a rated voltage of 35 kV, the separator length usually makes up 1 m, wherein the total length of the dielectric cover 14 is 3 m. So, the flashover length of the insulation cover 14 is 1.5 m, and the total flashover path length including the separator 17 makes up 2.5 m. With such a long total flashover length, there is no power arc follow.

In that example, as shown in FIG. 11, the dielectric cover 14 is made a varying section, increasing from the cover end to the fastening element 15. This allows to increase in impulse electric strength between the dielectric cover surface 14 and the power conductor 2, depending on variation of the electric field with sectional parameters, and thus such construction provides more reliable operation.

A construction version of the electric power transmission lines, particularly, two-phased, is possible, when the dielectric covers 14 are placed in opposite conductors of both phases.

Figure 12:
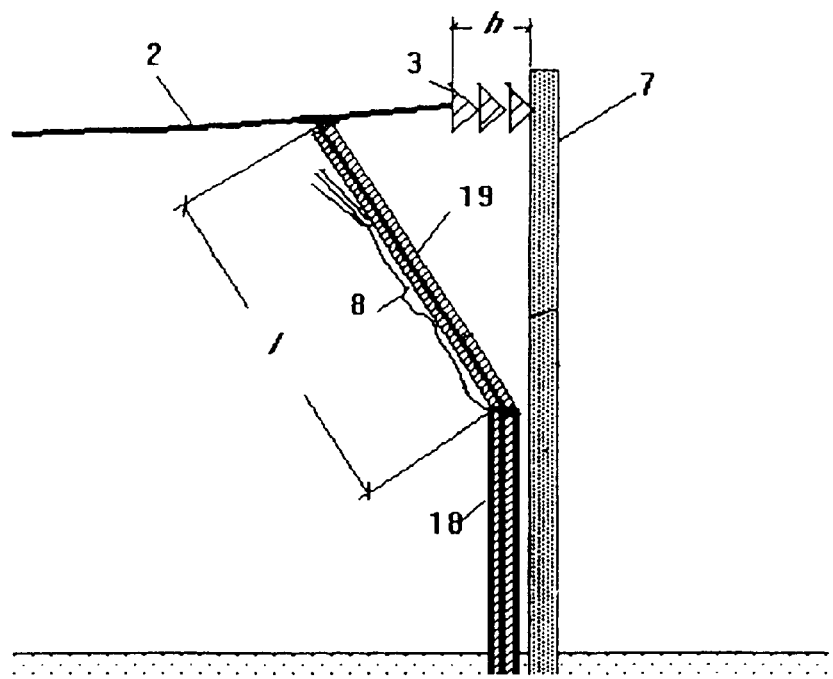
FIG. 12—Diagram of an electric power transmission line with means of protection against overvoltages, made in the form of the cable input termination.

In FIG. 12 another construction version of an electric power transmission line is shown where, besides the structure 7, the non-insulated power conductor 2 fastened on the said structure 7, the insulator 3 of the said power conductor 2 from the said structure 7, the said line comprises a cable input 18 with a termination 19. The said termination 19 is made so that its length l is more than that of the protected insulator flashover length h, wherein a flashover voltage of the termination is lower than the flashover voltage of the protected insulator. Particularly for an electric power transmission line with a nominal voltage of 6 kV the termination length is, according to the invention, 0.6 to 0.8 m, wherein the flashover voltage equals 60 to 90 kV. Insulators used in such electric power transmission lines have a length of 0.2 m and a flashover voltage of 100 to 110 kV. When a lightning overvoltage occurs at the power conductor 2, it is applied to the protected insulator 3 and the cable termination insulation 19. Moreover, a maximum electric field gradient takes place over the termination insulation surface near the end of a cable braid, where a surface discharge strikes. The said discharge will develop over the said termination towards the power conductor direction, forming a conducting spark channel as a result. Then, a lightning current flows from the said power conductor 2 towards the grounded cable braid. After this, the line will continue its normal operation without outage, since at the mentioned length of the termination, an impulse flashover does non turn into a power arc.

Figure 13:
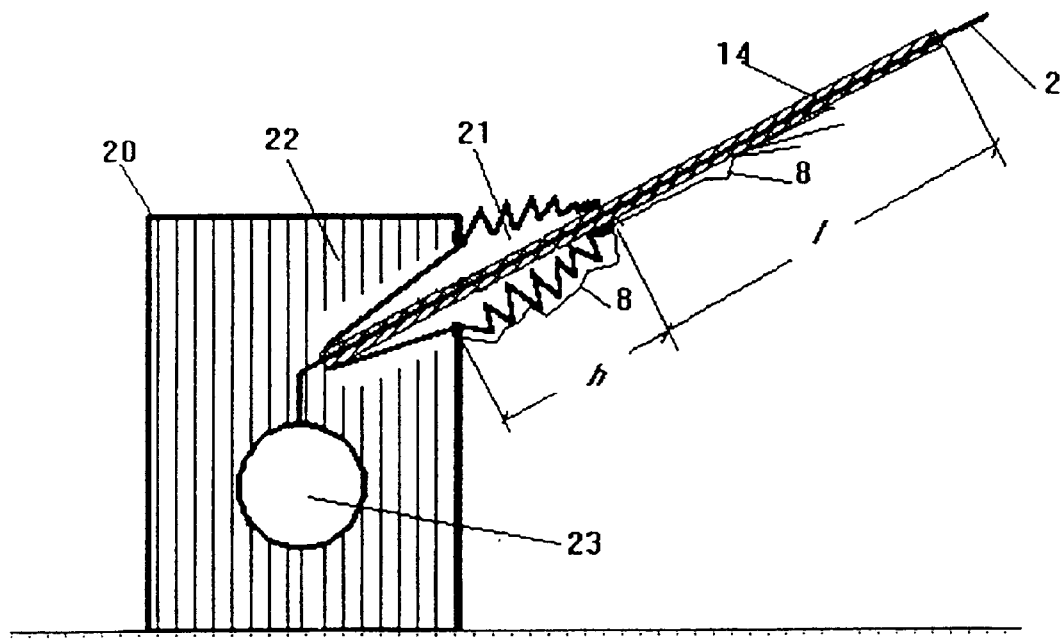
FIG. 13—Diagram of an electric power transmission line with a high-voltage substation bushing.

FIG. 13 shows a version of an electric power transmission line with a substation grounded tank 20, which is provided with a bushing 21 and containing an insulation 22 and a high-voltage equipment 23. On the power conductor 2 in the way of the said bushing location a dielectric cover 14 is placed, the length of which is defined by the above mentioned expression. In the present case, the dielectric cover 14 provides a protection against the said bushing 21 impulse flashover turning into a power arc, because the total path length of discharge channel 8 at a lightning overvoltage will include a flashover length h of the said bushing and a flashover length l over the said dielectric cover 14.

Figure 14:
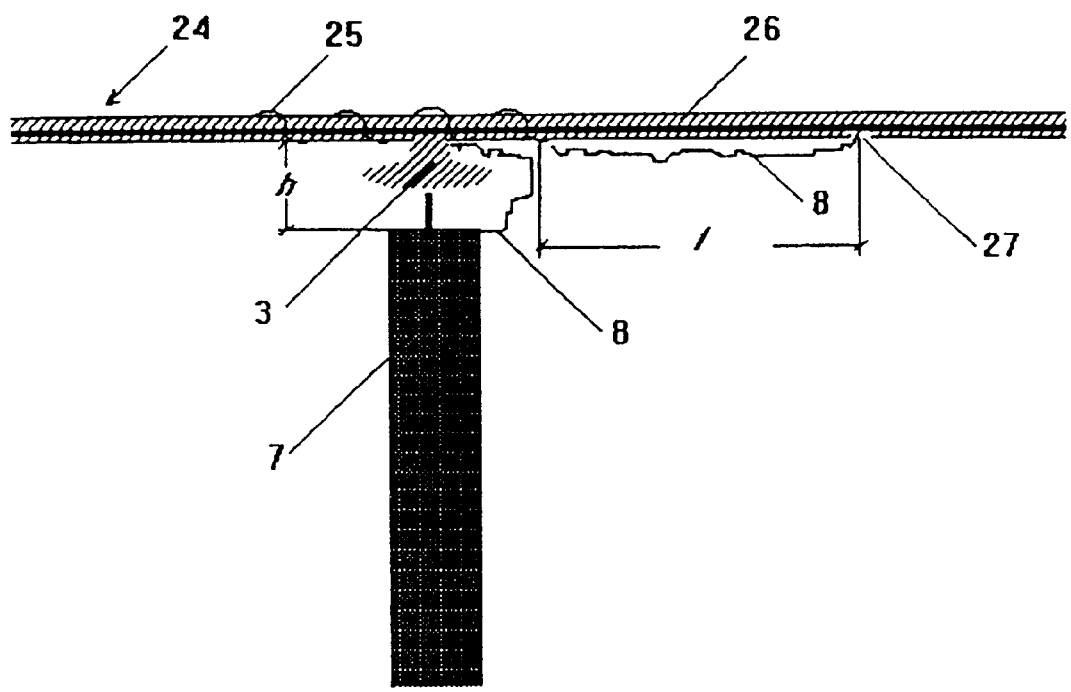
FIG. 14—Diagram of an electric power transmission line with an insulated power conductor.

In case of an electric power transmission line construction with an insulated power conductor (FIG. 14), the electric power transmission line will comprise the structure 7, the said insulated power conductor 24 fastened on the said structure by a fastening element 25, and the insulator 3 of the said power conductor 24 from the said structure 7. In insulation 26 of the power conductor 24 there is an orifice 27, which is placed at some previously set distance from the said fastening element 25.

For example, for an electric power transmission line with a nominal voltage of 10 kV, the distance l from the said fastening element 25 up to the said orifice 27 equals to 0.6 m. Insulators used in such lines have a flashover length of 0.2 m. When a lightning overvoltage occurs in such power lines, the protected insulator 3 flashes over and then the discharge propagates down the said insulation 26 of the power conductor 24 until it comes to the said orifice 27. Thus, the total flashover length will be 0.2+0.6=0.8 m, and with such a flashover path length there is no power arc follow and there will not be a short-circuit of the line.

Figure 15:
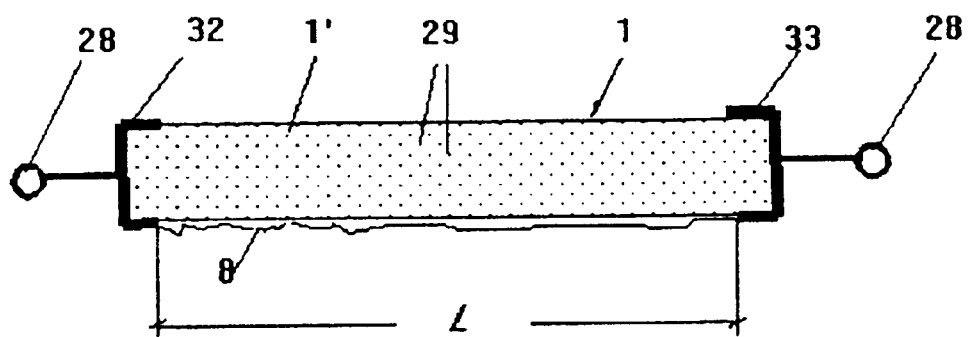
FIG. 15—Schematic drawing of an arrester according to the claims, with particles dispersed.

An impulse spark lightning arrester can be made in another construction version, as shown in FIG. 15. In this version, the arrester 1 comprises the elongated body $1^1$ made of a solid dielectric, at the ends of which are placed two main end electrodes 32 and 33 for connection of the said arrester by means of clamps 28 to electric power transmission line elements or to a high-voltage unit. Metal particles 29 are distributed uniformly in the whole body $1^1$ volume.

For instance, in an electric power transmission line with a nominal voltage 110 kV, for protecting the insulator having 1.2 m in length and a flashover voltage 690 kV, an arrester was made in the form of a light-stabilized polyethylene ribbon with a width of 10 mm, thickness of 2 mm and a length of 5 m. Metal particles of aluminum foil with a thickness of 0.05 mm in the form of square cuts with 2 mm sides were dispersed in the said polyethylene over the ribbon thickness and surface. The volumetric density of the aluminum particles equalled 15%. Tests by lightning impulse overvoltage have shown that, due to the presence of the said metal particles 29 in the body $1^1$, that initiate the passage of a discharge over the body $1^1$ surface, the flashover voltage of the arrester is only 530 kV i.e. 23% less, than the flashover voltage of the protected insulators string, while the arrester length is more than 4 times longer than the insulator string length.

Figure 16:
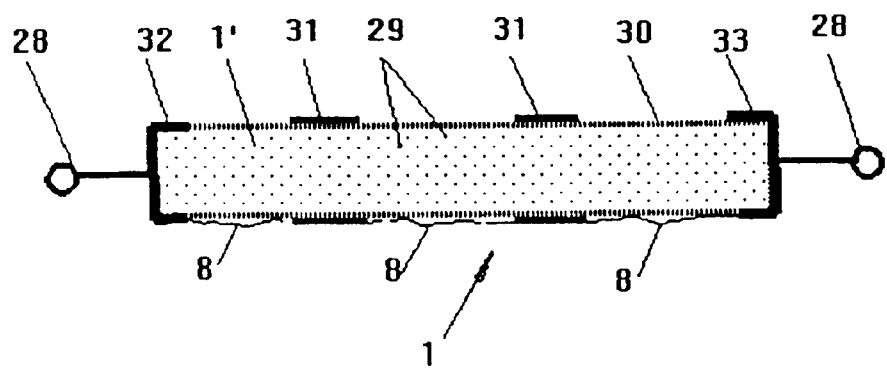
FIG. 16—Another modification of the arrester shown in FIG. 15.

FIG. 16 shows the same construction version of the arrester 1, wherein the said body $1^1$ made of dielectric is covered by a protection insulating or semi-conducting layer 30. Such a layer will provide reliable functioning of an arrester under tough operation conditions. On the surface of the said protection layer 30 intermediate electrodes 31 are placed. The discharge channel 8 develops between the electrodes 32 and 33, passing through the intermediate electrodes 31.

Figure 17:
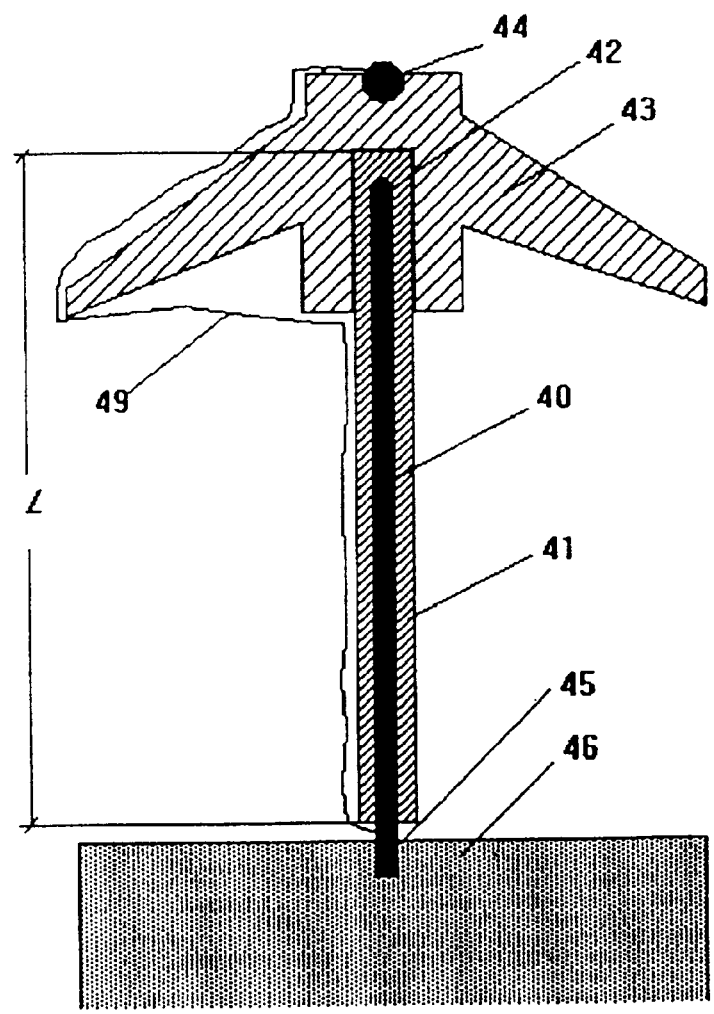
FIG. 17—Diagram of an electric power transmission line with a fitting where an insulator is fastened.

FIG. 17 shows a version of an electric power transmission line with a fitting which is made, according to the invention, in a form of cylindrical metal rod 40. There is a dielectric cover (insulation) 41 on the rod 40 side surface and on one of the end surfaces. The upper fitting end 42, coated with the insulation 41, works for fastening a high-voltage element of the electric power transmission line, for example an insulator 43 or a conductor 44, wherein a lower non-insulated end 45 provides fastening of the fitting to a support structure 46 for the said power transmission line.

Figure 18:
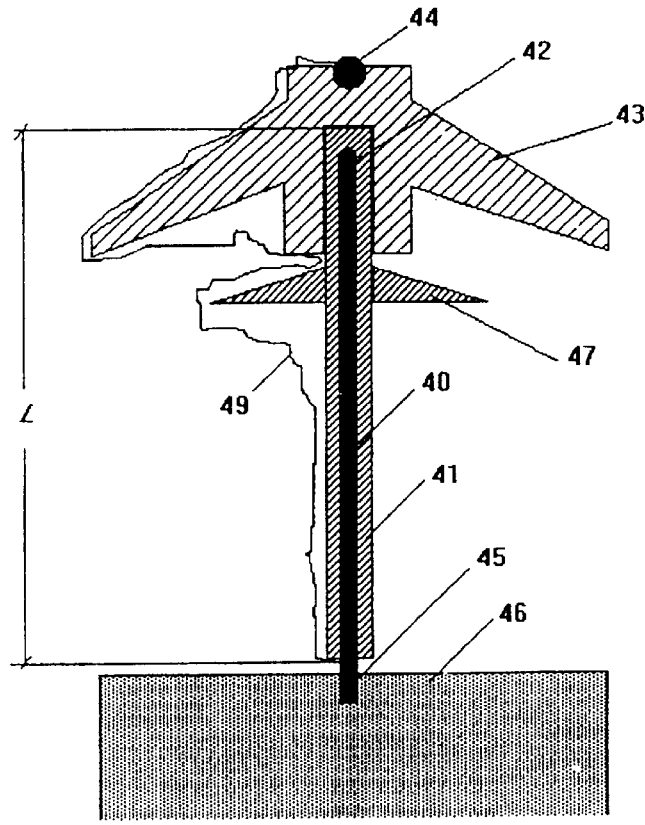
FIG. 18—Diagram of an electric power transmission line with a fitting provided with an additional insulation shed.

The fitting can be provided with an additional insulation shed 47 (FIG. 18), which increases the flashover voltage and extends flashover path as well.

Figure 19:
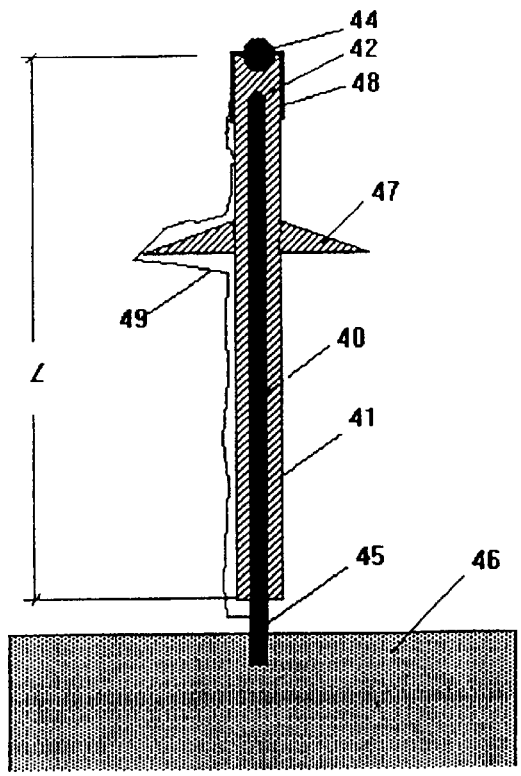
FIG. 19—Diagram of an electric power transmission line with a direct fastening of the conductor to the insulated fitting.

In FIG. 19 a fitting modification is shown, where on the insulated end 42, a metal flange 48 is placed such that it is connected directly (without insulator 43) to the power conductor 44. The said modification is expedient for rather low line voltages, for instance, 3 to 6 kV, and under easy pollution conditions, because all the operation voltage is applied to the insulation 41.

The electric power transmission with insulated fittings, described in the example shown, functions as follows (cf. FIG. 17). Under overvoltage of sufficient magnitude, the insulator 43 flashes over, i.e. a discharge channel 49 begins developing from the power conductor 44, bypasses the insulator 43 and reaches the dielectric cover 41, placed on the rod 40. Then the channel 49 of the said discharge is forced to propagates down the insulation cover until it reaches the non insulated end of the metal rod 40. After this, the lightning overvoltage current proceeds from the conductor 44 through the discharge channel 49 onto the structure 46 and further to ground. Due to a rather long length l of the fitting insulation providing a long flashover path, an impulse lightning flashover does not turn into a power arc and an electric power transmission line continues its operation without outage.

A fitting according to the invention can also be used as a lightning arrester. For this, the rod 40, coated with the dielectric cover 41, is fastened by its non insulated end 45 to the structure 46, wherein the insulated end 42 is placed opposite to the power conductor 44, forming with the latter a spark air gap. At overvoltage the said gap is broken down, the discharge channel reaches the insulated end 42 of the fitting and propagates down the dielectric cover 41 until it reaches the non insulated end 45 of the said fitting. The operation method in this case is the same as described above.

In accordance with the version shown in FIG. 17, a pilot sample of the fitting was made and tested. A metal rod with a diameter of 16 mm and a length of 65 cm was provided with an insulated cover of a polymer material of 6 mm thickness. The said insulated cover length equalled l=52 cm. In the insulated end of the fitting, a 6 kV glass insulator was installed. Both the insulator placed on the standard, i.e. non insulated fitting, and the insulator, placed on the insulated fitting, were tested by overvoltage lightning impulses of 1.2/50 μsec. The test results are shown in Table 2.

TABLE 2

| Fitting type | Flashover path, cm | Flashover voltage, kV | Average gradient of operation voltage in flashover channel, kV/m | Probability of a power arc follow |
|---|---|---|---|---|
| non-insulated | 16 | 126 | 21.7 | 0.29 |
| insulated | 62 | 180 | 5.6 | 0.00 |

As one can see from Table 2, for an insulated fitting, the flashover length is several times more and flashover voltage is higher, than that for a standard non insulated fitting. And, above all, the probability of power arc follow for the insulated fittings is equal to zero.

Figure 20:
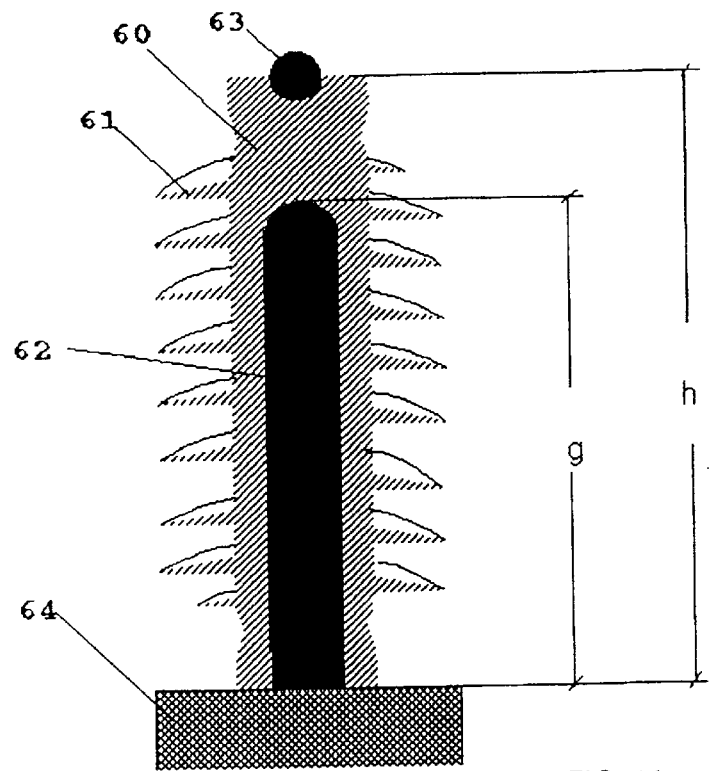
FIG. 20—Schematic drawing showing an high-voltage insulator in cross section.

FIG. 20 shows a high-voltage insulator according to the invention. It comprises an insulation body 60 with spiral-like sheds 61 and a guiding electrode 62, which provides conditions for a surface discharge development over the insulator surface.

When a lightning impulse is applied to the insulator, a discharge channel starts from a power conductor 63. The guiding electrode 62, which has ground potential, enhances the electric field strength at the tip of a flashover channel and ensures more favorable conditions for the flashover to develop along the surface of the insulator rather than through the shortest way in air. Due to the spiral sheds, the flashover goes by the long spiral path along the surface of the insulator. Therefore the electric field mean gradient at nominal voltage along the channel is low and there is no power arc follow.

For standard insulators (with parallel or spiral sheds) flashover develops through the shortest way in air.

As our research has shown, in order to make a discharge to develop over the said insulator surface by a spiral-like trajectory and not by the shortest way in air, the guiding electrode length g has to be at least equal to half of the insulation body length.

An insulator, described in FIG. 20, may be used at a rather low nominal voltage of 6 to 10 kV, since all the working voltage in the normal mode is applied to the solid insulation layer between the conductor 63 and the guiding electrode 62. This layer should sustain reliably the operation voltage in long-term mode during the whole insulator life time.

Figure 21:
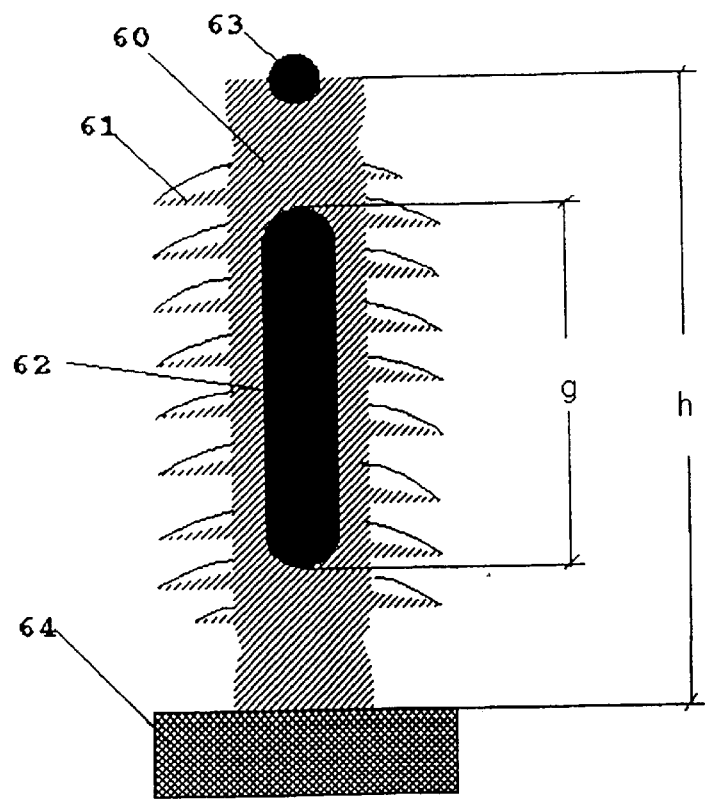
FIGS. 21–23—Modifications of high-voltage insulators in cross section.

For a higher nominal voltage, the guiding electrode 62 can be insulated both from power conductor 63 and from a structure 64 (FIG. 21). In this insulator construction version, an operation voltage of a power frequency is already distributed between two solid insulation layers, i.e. between the conductor 63 and the guiding electrode 62, as well as between the guiding electrode 62 and the structure 64.

At overvoltage applied to the power conductor 63 in the insulated metal guiding electrode 62 a division (polarization) of electric charges takes place: first polarity charges in the conductor 63 are removed to the upper part of the guiding electrode 62, while opposite polarity charges in the conductor 63 are moved lower down in the guiding electrode 62. The upper placed charges of the guiding electrode 62 strengthen the electric field gradient on the insulator surface near the conductor 63 and simplify by this the formation of a surface discharge over the insulator surface.

Figure 22:
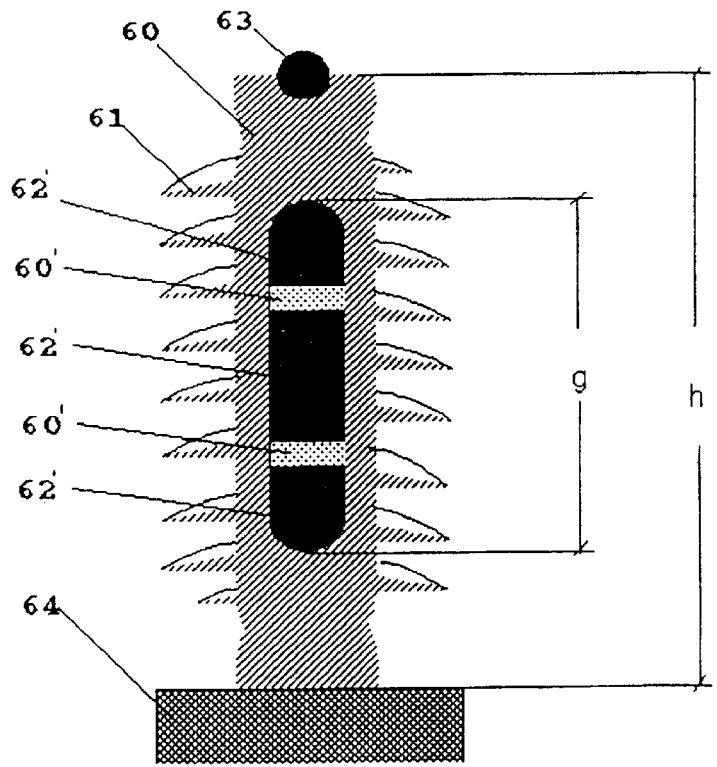

For a further increasing of the inner insulation, the guiding electrode 62 can made as an electrode set 62$^1$, which are divided by insulation layers 60$^1$ (FIG. 22).

Figure 23:
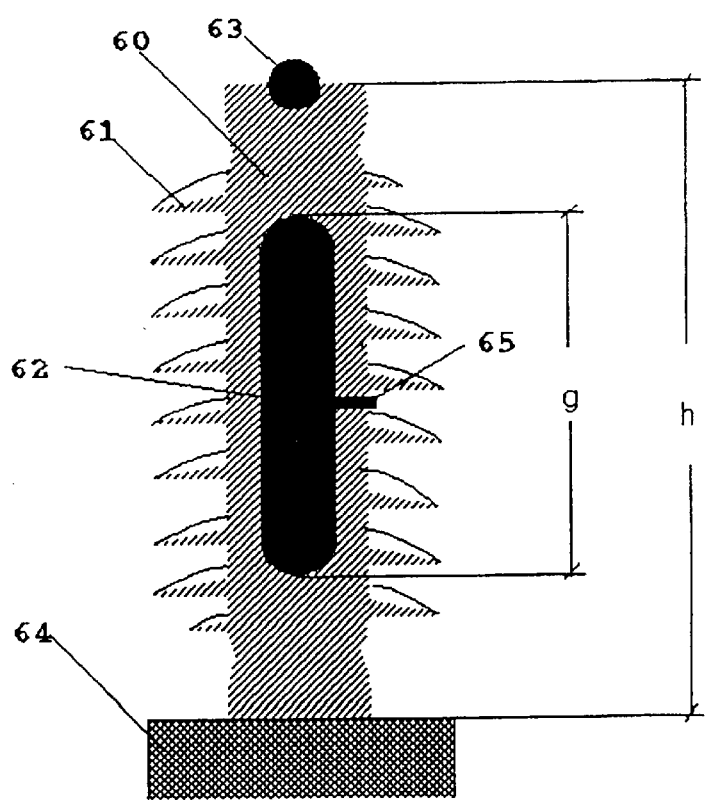

To facilitate the said discharge development over the insulator surface at overvoltage, the guiding electrode 62 can be made with a ledge 65, extending to the insulation body surface 60 (FIG. 23). In this case, the said discharge development along the spiral-like trajectory over the insulator surface is made easier, since it takes place in two stages: first, there is a flashover between the conductor 63 and the ledge 65; second, the said discharge moves up to the grounded structure 64.

To provide more reliable discharge development along the spiral-like trajectory, the guiding electrode can be made also in a spiral form.

To avoid pollution effects on the insulator discharge characteristics, as well as to provide more reliable discharge development along the spiral-like trajectory, the insulator surface in the inter-shed spaces can be coated with some semi-conductive layer.

To increase the nominal voltage of the said insulation construction, the depicted insulator types can be connected step-by-step, i.e. they can form insulator strings or support columns.

The above-described invention versions and modifications of electric power transmission line, impulse spark lightning arrester, high-voltage insulator and fitting to fasten a high-voltage element are shown only to explain their construction and operation principles. It should be clear to experts in this field that any variations of the above mentioned examples are possible, and they are also within the scope of our invention.

INDUSTRIAL APPLICABILITY

The invention can be used for lightning protection of overhead transmission and distribution power lines and substations.

What is claimed is:

1. An electric power transmission line comprising
line elements including a first line element;
a power conductor;
an insulation element extending between the first line element and the power conductor and defining a first flashover path, said first line element and said power conductor adapted to be subjected to different potentials, and
protection means protecting the insulation element against lightning overvoltage, said protection means having a surface defining a second flashover path between said first line element and an element of the protection means electrically connected to the power conductor, or directly between said first line element and said power conductor, said second flashover path being longer than said first flashover path.

2. The transmission line defined in claim 1 wherein the length of the second flashover path is defined by the following relationship:

$$L > 0.06 U^{0.75}$$

where:

L=the length of the second flashover path measured in meters, and

U=rated line voltage of the power conductor measured in kilovolts.

3. The transmission line defined in claim 2 wherein said protection means comprise an impulse sparkover arrester which includes an elongated dielectric body having opposite ends;

a first main electrode consisting of a pair of end electrodes at opposite ends of the body connected by a conductive rod extending through said body, and a second main electrode located on said dielectric body between the ends of said body.

4. The transmission line defined in claim 3 wherein said arrester is installed electrically in parallel with said insulation element.

5. The transmission line defined in claim 4 wherein said end electrodes are electrically connected to the power conductor.

6. The transmission line defined in claim 5 wherein said first line element is grounded and said second main electrode is electrically connected directly to said first element.

7. The transmission line defined in claim 4 wherein one of said line elements is grounded and said second main electrode is connected to said one element through a spark gap.

8. The transmission line defined in claim 4 wherein said first line element is grounded and electrically connected to at least one of said end electrodes.

9. The transmission line defined in claim 8 wherein said second main electrode is electrically connected to the power conductor through a spark gap.

10. The transmission line defined in claim 4 wherein one of the line elements is a grounded structure;

the transmission line includes two power conductors in two different circuits said power conductors being subjected to the same potential;

said end electrodes are connected to different power conductors, and said second main electrode is connected to said grounded structure.

11. The transmission line defined in claim 4 wherein one of said line elements is a grounded structure;

said transmission line includes two power conductors in different circuits;

said end electrodes are connected to different power conductors through a spark gap, and said second electrode is connected to the grounded structure.

12. The transmission line defined in claim 4 wherein the dielectric body and said rod are bent into a loop form, and further including a jumper electrically connecting said end electrodes.

13. The transmission line defined in claim 12 and further including an additional arrester similar to first-mentioned arrester, and the end electrodes of the additional arrester are electrically connected to the end electrodes of the first-mentioned arrester so as to form a doubled arrester.

14. The transmission line defined in claim 13 and further including an additional doubled arrester similar to the first-mentioned doubled arrester, and means for electrically connecting one of the second main electrodes of said first-mentioned doubled arrester to one of the second main electrodes of said additional doubled arrester to form a string of arresters.

15. The transmission line defined in claim 3 wherein the power conductor has a disconnection point, said end electrodes are connected in series with the power conductor at said disconnection point, and said second electrode is connected to the insulation element.

16. The transmission line defined in claim 2 wherein said protection means are connected electrically in series with the insulation element;

comprise a dielectric cover at which surface flashover extends along the length l, said cover being located on said power conductor or on one of said line elements in contact with the insulation element;

said dielectric cover has a puncture voltage that is higher than its flashover voltage, said insulation element and said cover defining a total flashover path having a flashover length L=l+h, said cover having a length D defined by the following relationship:

$$2 \times (0.006\ U^{0.75} - h) < D < 2 \times (0.5\ U^{0.75} - h)$$

where:

D=dielectric cover length measured in meters, l=flashover length of the cover measured in meters, h=flashover length of the insulation element measured in meters, and U=rated line voltage of power conductor measured in kilovolts.

17. The transmission line defined in claim 16 wherein said dielectric cover covers a segment of said power conductor and has opposite ends;

a fastening element is engaged to the surface of said cover between said ends;

said insulation element is connected between said fastening element and a support structure, and the distance between the fastening element and an end of said dielectric cover is defined by the following relationship:

$$0.06\ U^{0.75} - h < l < 0.05\ U^{0.75} - h$$

where:

l=distance between the edge of the fastening element and the corresponding end of the dielectric cover measured in meters, h=insulation element flashover path length measured in meters, and U=rated line voltage measured in kilovolts, such that surface protective flashover extends along a path having a length L=l+h.

18. The transmission line defined in claim 2 wherein one of said line elements is a second conductor;

said protection means are installed electrically in series with the insulation element and comprise dielectric covers installed on said power conductor and on said second conductor, said insulation element being located between the two conductors;

at both of said covers surface flashover extends along the length l;

said covers are located in contact with the insulation element;

the puncture voltage of said covers is higher than their flashover voltage, and the insulation element and covers define a total flashover path having a length L=2 l+h, the length D of the said dielectric covers being defined by the following relationship:

$$(0.06\ U^{0.75}-h)<D<(0.5\ U^{0.75}-h)$$

where:
D=dielectric cover length measured in meters,
h=flashover length of the protected line insulation element measured in meters, and
U=rated line voltage measured in kilovolts.

19. The transmission line defined in claim 18 and further including an auxiliary electrode on the surface of one of said covers to provide, under an overvoltage condition, a spark connection between said power conductor and said second conductor.

20. The transmission line defined in claim 1 wherein
said line elements include at least one cable input with termination, and
said protection means comprise a cable termination having an insulating surface with a flashover voltage lower than that of the insulation element and with a length l defined by the following relationship:

$$0.06\ U^{0.75}<l<0.5\ U^{0.75}$$

where:
l=cable termination length measured in meters, and
U=rated line voltage measured in kilovolts.

21. The transmission line defined in claim 1 wherein
said power conductor is covered by insulation;
the insulation element includes an insulator fixed to said first line element and provided with a fastening element connecting said power conductor to said insulator;
said protection means are constituted by a portion of said insulation and an orifice in said insulation such that said orifice is spaced from said fastening element at a distance that is defined by the following relationship:

$$0.06\ U^{0.75}-h<l<0.5\ U^{0.75}-h$$

where:
l=distance from said orifice to an edge of the fastening element measured in meters,
h=protected insulator flashover path length measured in meters, and
U=rated line voltage measured in kilovolts,
such that protective flashover extends along a path having a length L=l+h.

22. An impulse spark lightning arrester comprising
an elongated dielectric body having opposite ends
first and second end electrodes mounted to said ends;
an electrically conductive rod connecting said end electrodes through said body so as to form a unified main electrode, and
a second main electrode on the surface of said body between said ends, said second main electrode being located such that the distance between the second main electrode and each of said end electrodes is defined by the following relationship:

$$0.06\ U^{0.75}<L<0.5\ U^{0.75}$$

where:
L=distance between the second main electrode and each of the end electrodes measured in meters, and
U=rated line voltage measured in kilovolts.

23. The arrester defined in claim 22 wherein said body and said rod are bent into a loop, and further including a jumper electrically connecting said end electrodes.

24. The arrester defined in claim 22 wherein said body has a cross section which varies along the length of the body increasing from said opposite ends to the middle of the body.

25. An impulse spark lightning arrester for protecting insulation elements of electric power transmission lines and high-voltage units comprising
an elongated dielectric body having opposite ends;
first and second end electrodes mounted to said opposite ends for connecting the arrester with a power transmission line or high voltage unit, and
a dispersal of electrically conducting, semi-conducting or ferroelectric particles on or in said body, said particles being from 10 mcm to 5 mm in size with a volumetric density from 5% to 30%, the distance between said end electrodes being defined by the following relationship:

$$0.06\ U^{0.75}<L<0.5\ U^{0.75}$$

where:
L=distance between the end electrodes measured in meters, and
U=rated line voltage measured in kilovolts.

26. The arrester defined in claim 25 wherein said body is covered by an insulating or semi-conductive layer.

27. The arrester defined in claim 25 and further including intermediate electrodes placed on said body.

28. The arrester defined in claim 25 and further including an electrically insulating carrier element mounted to the whole length of said body, said carrier element being fastened to said end electrodes.

29. A fitting for fastening an electrotechnical high-voltage element to an electric power transmission line structure comprising
a metal rod having one end adapted to be connected to a high voltage element and a second end for fastening to a support structure, and
a dielectric cover covering a side surface of said rod and said one end thereof, said cover having a length, at which protective flashover may extend, defined by the following relationship:

$$0.06\ U^{0.75}<l<0.5\ U^{0.75}$$

where:
l=length of the dielectric cover measured in meters, and
U=rated line voltage measured in kilovolts.

30. The fitting defined in claim 29 and further including at least one insulation shed mounted on said cover.

31. A high-voltage insulator for a power conductor installation on an electric power transmission line structure comprising
an electrically insulating body having opposite ends and spiral-like sheds, one of said ends providing a fastening to a power conductor and the other of said ends adapted to be fastened to a support structure, and
a guiding electrode inside said body, said guiding electrode being longer than one-half the length of said body and positioned inside said body such that the puncture voltage of said body is higher than the flashover voltage of said insulator whereby protective flashover extends over the surface of said shed by a spiral path defining a protective flashover path whose length L is defined by the following relationship:

$$L > 0.06 \ U^{0.75}$$

where:

L=protective flashover length measured in meters, and

U=rated line voltage measured in kilovolts.

32. The insulator defined in claim 1 wherein said guiding electrode comprises a set of electrodes electrically insulated from one another.

33. The insulator defined in claim 31 wherein the guiding electrode has a ledge extending to the surface of said body.

* * * * *